United States Patent
Parthasarathi et al.

(10) Patent No.: US 12,452,669 B2
(45) Date of Patent: Oct. 21, 2025

(54) SYSTEM AND METHOD FOR DYNAMIC MANAGEMENT OF ULTRA-WIDEBAND RANGING SESSIONS

(71) Applicant: NXP B.V., Eindhoven (NL)

(72) Inventors: Srivathsa Masthi Parthasarathi, Bangalore (IN); Pablo Corbalán Pelegrín, Callosa de Segura (ES); Yuvaraj Pargunam, Dharmapuri (IN); Michael Stark, Gleisdorf (AT)

(73) Assignee: NXP B.V., Eindhoven (NL)

( * ) Notice: Subject to any disclaimer, the term of this patent is extended or adjusted under 35 U.S.C. 154(b) by 128 days.

(21) Appl. No.: 18/408,998

(22) Filed: Jan. 10, 2024

(65) Prior Publication Data
US 2025/0142332 A1    May 1, 2025

(30) Foreign Application Priority Data
Oct. 30, 2023    (IN) .............................. 202341073655

(51) Int. Cl.
*H04W 12/08*    (2021.01)
*H04W 72/56*    (2023.01)

(52) U.S. Cl.
CPC ............ *H04W 12/08* (2013.01); *H04W 72/56* (2023.01)

(58) Field of Classification Search
CPC ....... H04W 12/08; H04W 72/56; H04W 4/80; G01S 5/0215; G01S 5/0205; G01S 7/003; G01S 13/765
See application file for complete search history.

(56) References Cited

U.S. PATENT DOCUMENTS

| 11,564,057 B2 | 1/2023 | Barton et al. |
| 2009/0088077 A1* | 4/2009 | Brown ................. H04W 88/06 340/572.1 |

(Continued)

FOREIGN PATENT DOCUMENTS

| WO | 2023164379 A1 | 8/2023 |
| WO | 2023164587 A1 | 8/2023 |
| WO | 2023167858 A1 | 9/2023 |

OTHER PUBLICATIONS

Liu, Kuang-Hao, et al.; "Exclusive-Region Based Scheduling Algorithms for UWB WPAN"; IEEE Transactions on Wireless Communications, Mar. 2008, pp. 933-942, vol. 7, No. 3.

(Continued)

*Primary Examiner* — El Hadji M Sall

(57) ABSTRACT

An ultra-wideband (UWB) system of a UWB-enabled device dynamically schedules UWB ranging sessions with multiple asynchronous access control devices. The UWB system creates one ranging session for each access control device and schedules each ranging session with equal priority. During each ranging session, the UWB system receives a ranging message from a corresponding access control device, with the ranging message including a ranging management list (RML) that includes identifiers associated with UWB systems that are within an access control range of the corresponding access control device. The UWB system updates the priority of each ranging session based on presence or absence of the corresponding identifier in the RML of the received ranging message. Further, the UWB system schedules the ranging sessions with the updated priority to dynamically prioritize one access control device, thereby enabling an operation between the UWB system and the corresponding access control device.

20 Claims, 12 Drawing Sheets

(56) References Cited

U.S. PATENT DOCUMENTS

| | | |
|---|---|---|
| 2015/0200706 A1 | 7/2015 | Bottazzi et al. |
| 2022/0139133 A1 | 5/2022 | Schober et al. |
| 2023/0065013 A1 | 3/2023 | Kim et al. |
| 2023/0171729 A1 | 6/2023 | Oh et al. |
| 2024/0129886 A1* | 4/2024 | Bingesser .............. H04W 12/06 |
| 2024/0260076 A1* | 8/2024 | Habib ................... H04W 76/36 |
| 2025/0056627 A1* | 2/2025 | Reddy ................... G01S 13/765 |

OTHER PUBLICATIONS

E. F. Jones, "Scheduling 101—the basic of best practices"; Paper presented at PMI® Global Congress, 2009, Orlando, Florida; Oct. 13, 2009; https://www.pmi.org/learning/library/schedule-101-basic-best-practices-6701.

U.S. Appl. No. 18/485,417, filed Oct. 12, 2023; Christian Eisendle et al.; "Method for Managing UWB Communication Sessions".

* cited by examiner

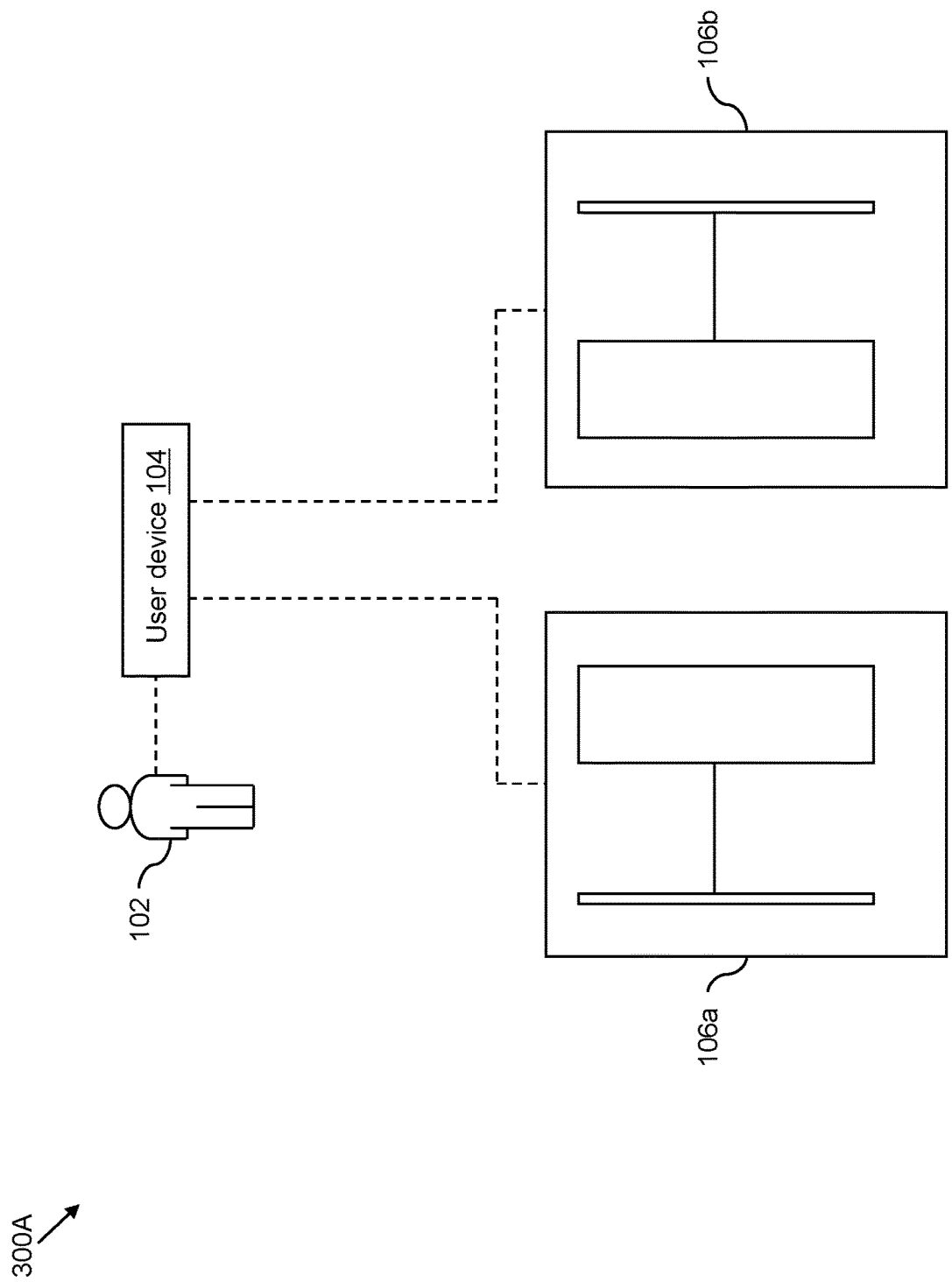

SYSTEM AND METHOD FOR DYNAMIC MANAGEMENT OF ULTRA-WIDEBAND RANGING SESSIONS

CROSS-REFERENCE TO RELATED APPLICATIONS

This application claims the priority under 35 U.S.C. § 119 of India patent application Ser. No. 202341073655, filed on Oct. 30, 2023, the contents of which are incorporated by reference herein.

FIELD OF USE

The present disclosure relates generally to wireless communication, and, more particularly, to a system and a method for dynamic management of ultra-wideband ranging sessions.

BACKGROUND

Ultra-wideband (UWB) technology is widely used for ranging purposes. The UWB technology uses a low energy level for short-range, high-bandwidth communication. One example of the UWB use case is transportation services provided by a city metro, where a user (e.g., a UWB-enabled user device of the user) must pass through a transit gate (e.g., a UWB-enabled access control device installed in the transit gate) to avail the transportation service. In such a scenario, the user device may need to interact with multiple access control devices set up at a metro station before the access operation is executed with a desired access control device. In some stations, the access control devices may be in proximity and may operate asynchronously. As a result, when the user device is communicating with the desired access control device, the communication may be affected by the neighboring access control devices, leading to a significant delay, and sometimes failure, in granting access to the user, thereby causing inconvenience to the user.

BRIEF DESCRIPTION OF DRAWINGS

The following detailed description of the embodiments of the present disclosure will be better understood when read in conjunction with the appended drawings. The present disclosure is illustrated by way of example, and not limited by the accompanying figures, in which like references indicate similar elements.

FIGS. 3A-3H are diagrams that illustrate exemplary scenarios in which one access control device is dynamically prioritized in accordance with an embodiment of the present disclosure.

DETAILED DESCRIPTION

Figure 1:
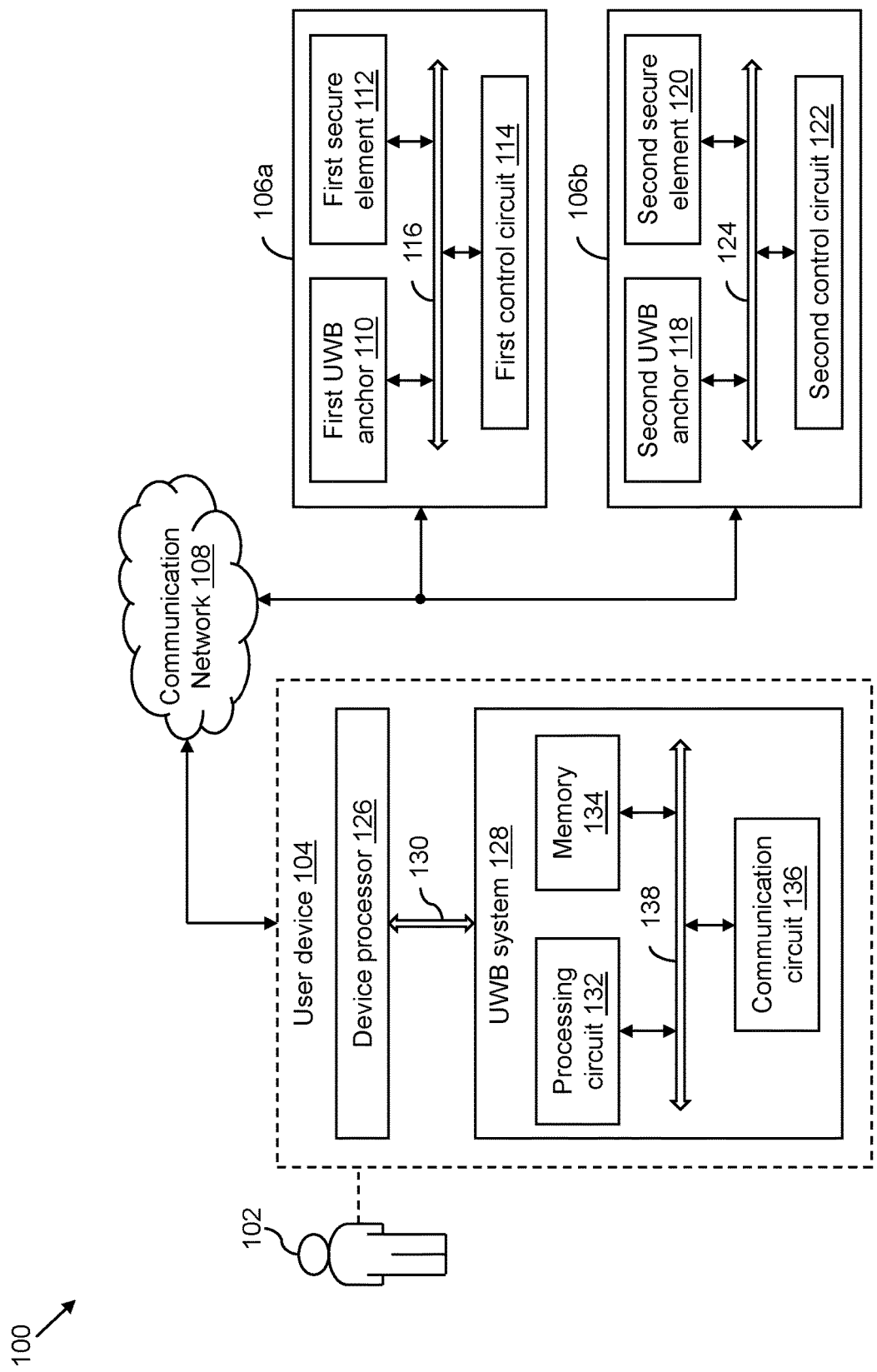
FIG. 1 illustrates a schematic diagram of an ultra-wideband (UWB) environment in accordance with an embodiment of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

Typically, for an access control device to grant access to a user (e.g., a user device of the user), the access control device may need to locate the user device and determine whether the user device is approaching the corresponding access control device. Ultra-wideband (UWB) ranging sessions are executed between the UWB-enabled user device and each UWB-enabled access control device to enable detection of the user device by the corresponding access control device. For example, a user device may include a UWB system, whereas an access control device may include a UWB anchor to enable UWB communication therebetween. As the access control devices set up in a metro station scenario may operate asynchronously, the UWB ranging sessions of these access control devices may overlap, leading to interference, and in turn, data corruption. This leads to a significant delay, and sometimes failure, in granting access to the user. Downlink time difference of arrival (DL-TDoA) networks and additional UWB anchors can be deployed in the metro station to synchronize the access control devices and enable user positioning, thereby preventing interference. However, such a deployment results in a significant increase in the operational costs of the transit operation, and hence, may deter a transit operator. Consequently, the problem of interference during UWB communication may persist, which may degrade the user experience.

Various embodiments of the present disclosure disclose a UWB system of a user device. The UWB system enables UWB communication with various access control devices that regulate a service to be availed by a user of the user device. The UWB system may include a processing circuit that may create one ranging session for each access control device associated therewith. Further, the processing circuit may schedule each ranging session to receive a ranging initiation message associated with the corresponding access control device. The ranging sessions are scheduled in a sequential manner, with each ranging session being scheduled until a corresponding ranging initiation message is received. Further, the processing circuit may identify that the received ranging initiation messages are overlapping, and as a result, determine that the access control devices are asynchronous. Consequently, the processing circuit may schedule the ranging sessions with equal priority.

During each ranging session, the processing circuit may receive a ranging message associated with the corresponding access control device. The ranging message includes a ranging management list (RML) that includes identifiers associated with various UWB systems that are within an access control range of the corresponding access control device. The processing circuit may update the priority of each ranging session based on the presence or absence of an identifier associated with the UWB system (e.g., the user device) in the RML of the ranging message received during the corresponding ranging session. Further, the processing circuit may schedule the ranging sessions with the updated priority to dynamically prioritize one access control device. The dynamic prioritization of one access control device corresponds to scheduling of a corresponding ranging session multiple times in a sequential manner. Based on the dynamic prioritization of one access control device, an operation (e.g., an access control operation, a transaction operation, or the like) between the UWB system and the corresponding access control device is enabled.

Thus, the UWB communication technique of the present disclosure utilizes the RML of the ranging message to dynamically prioritize the interaction of the user device with one access control device and to ensure neighboring access control devices do not cause interference or collisions. This is in contrast to a conventional solution where DL-TDoA networks and additional UWB anchors (e.g., apart from the ones included in the access control devices) are deployed to synchronize the asynchronous access control devices. As the UWB communication technique of the present disclosure does not require the deployment of massive networks or a large number of UWB anchors, the UWB communication technique of the present disclosure is cost-effective and can be implemented in current transit and other access control operations without adding a huge strain on the operational costs. Additionally, the dynamic prioritization of the desired access control device results in the user (e.g., the user device) being granted access in a swift manner, thereby significantly improving the user experience. Further, the UWB communication technique of the present disclosure does not require the user device to perform any distance estimates, as the presence of the identifier in the RML is indicative of the nearness of the user device to the access control device. Consequently, the UWB communication technique of the present disclosure can be implemented in scenarios where user devices are incapable of performing distance estimates.

FIG. 1 illustrates a schematic diagram of an ultra-wideband (UWB) environment 100 in accordance with an embodiment of the present disclosure. The UWB environment 100 may include a user 102 and a user device 104 associated with the user 102. The user device 104 may be a UWB-enabled communication device associated with the user 102. UWB communication is a type of wireless communication that involves the transmission of data between devices using a broad frequency band and short-duration, low-energy pulses. Unlike standard wireless communication systems, which work within specified frequency bands, UWB devices broadcast signals over a wide frequency range, generally reaching several gigahertz (GHz). Examples of the user device 104 may include a mobile device, a smartwatch, a smart key, a smart card, or the like.

The UWB environment 100 may further include one or more service providers (not shown). A service provider may be a company, an organization, an establishment, or the like, that may offer services to the user 102. Examples of service providers may include city metros, libraries, hotels, banks, or the like. Further, examples of the services offered by the service providers may include city metros offering transportation services, libraries offering book lending services, hotels offering room access, banks offering financial services, or the like. The service provider may establish infrastructure to offer the services to the user 102. The infrastructure may thus implement various functions such as user authentication, transaction authorization, user access, or the like. The infrastructure may include multiple access control devices to regulate the services thereof. For example, the UWB environment 100 may further include first and second access control devices 106a and 106b of one service provider to regulate the services thereof. Examples of an access control device may include a locking device, a fare collection terminal, a kiosk, a point-of-sale (POS) terminal, or the like.

The user 102 may thus avail the services offered by the service provider by way of the access control devices. For example, if the service provider corresponds to a city metro, the user 102 (e.g., the user device 104) may be required to pass through entry and exit fare collection terminals (e.g., entry and exit gates with the first and second access control devices 106a and 106b installed therein, respectively) located in a metro station to avail the transportation services offered by the service provider. In such a scenario, at the time of the entry, the user device 104 and the first access control device 106a may communicate (e.g., interact) to enable the user 102 to enter a metro platform and use the transportation service. Similarly, at the time of the exit, the user device 104 and the second access control device 106b may communicate (e.g., interact) to enable the user 102 to exit the metro platform after having used the transportation service.

The UWB environment 100 may further include a communication network 108, with the user device 104 communicating with the first and second access control devices 106a and 106b by way of the communication network 108. Examples of the communication network 108 may include the Internet, a local area network (LAN), a wide area network (WAN), or the like.

Each access control device may include a UWB anchor to enable communication with the UWB-enabled user device 104. The communication between the user device 104 and each of the first and second access control devices 106a and 106b is enabled by way of UWB ranging sessions (hereinafter referred to as "ranging sessions"). Ranging sessions are utilized by an access control device to spatially detect a user device.

The first and second access control devices 106a and 106b are collectively referred to as a "plurality of access control devices 106a and 106b". Hereinafter, the first access control device 106a may also be referred to as an "entry control device 106a" and the second access control device 106b may also be referred to as an "exit control device 106b". Further, although FIG. 1 illustrates that the UWB environment 100 includes two access control devices (e.g., the entry and exit control devices 106a and 106b), the scope of the present disclosure is not limited to it. In other embodiments, the service provider infrastructure may include more than two access control devices, without deviating from the scope of the present disclosure. In such a scenario, more than one exit control device and/or more than one entry control device may be in communication with the user device 104.

The plurality of access control devices 106a and 106b are near each other (e.g., within three meters (m)) and operate in an asynchronous manner (e.g., associated ranging sessions with the user device 104 may be overlapping). Typically, in such a scenario, when a user, along with the associated user device, is passing through a gate, the communication between the user device and the access control device of the corresponding gate may be affected due to interference from neighboring access control devices. Consequently, the access granted to the user may be delayed, thereby leading to an inconvenience to the user. Conventionally, to provide accurate communication between a user device and each access control device of a metro station, downlink time difference of arrival (DL-TDoA) networks and additional UWB anchors may be required to be deployed in the metro station. The DL-TDoA networks and additional UWB anchors synchronize the access control devices, and in turn, prevent collisions of ranging sessions. However, such a deployment results in a significant increase in the operational costs of the metro station, and may deter transit operators, thereby resulting in a sub-par user experience.

In the present disclosure, the communication between each of the plurality of access control devices 106a and 106b and the user device 104 is enabled such that, even though the plurality of access control devices 106a and 106b are asynchronous, when the user 102, along with the user device 104, passes through a gate, the corresponding access control device accurately interacts with the user device 104, and the access is granted to the user 102 in a swift manner. Further, the aforementioned UWB communication technique is implemented without deploying massive DL-TDoA networks and/or additional UWB anchors in the metro station. The UWB communication technique of the present disclosure thus provides a cost-effective solution to improve the accuracy, efficiency, and user experience of the UWB access control operations in various applications (especially, transit applications).

To enable such a UWB communication, the user device 104 and the entry and exit control devices 106a and 106b include various components. For example, the entry control device 106a may include a first UWB anchor 110, a first secure element 112, a first control circuit 114, and a first communication channel 116. The first UWB anchor 110, the first secure element 112, and the first control circuit 114 may communicate with each other by way of the first communication channel 116. Similarly, the exit control device 106b may include a second UWB anchor 118, a second secure element 120, a second control circuit 122, and a second communication channel 124. The second UWB anchor 118, the second secure element 120, and the second control circuit 122 may communicate with each other by way of the second communication channel 124. Further, the user device 104 may include a device processor 126, a UWB system 128, and a third communication channel 130. The device processor 126 and the UWB system 128 may communicate with each other by way of the third communication channel 130. Additionally, the UWB system 128 may include a processing circuit 132, a memory 134, a communication circuit 136, and a fourth communication channel 138. The processing circuit 132, the memory 134, and the communication circuit 136 may communicate with each other by way of the fourth communication channel 138. Examples of each of the first through fourth communication channels 116, 124, 130, and 138 may include a serial peripheral interface (SPI), an inter-integrated channel (I2C), or the like. The communication between the user device 104 and the entry and exit control devices 106a and 106b is explained in detail below.

The first UWB anchor 110 may include suitable circuitry that may be configured to perform one or more operations. For example, the first UWB anchor 110 may be configured to communicate with various user devices using UWB technology. The first UWB anchor 110 may have an access control range associated therewith. The access control range defines a range within which the first UWB anchor 110 ranges (e.g., ranging sessions are executed) with user devices. Thus, when the user device 104 is present within the access control range, the first UWB anchor 110 initiates the communication therewith.

The communication between the first UWB anchor 110 and the user device 104 may be implemented using ranging sessions. Thus, to initiate the communication with the user device 104, the first UWB anchor 110 may be further configured to generate a first ranging initiation message and transmit the first ranging initiation message to the user device 104. Additionally, for each ranging session, the first UWB anchor 110 may be configured to generate a first ranging message including a first ranging management list (RML). The first RML includes a plurality of identifiers associated with a plurality of UWB systems (e.g., a plurality of user devices) that are within the access control range of the first UWB anchor 110. In an embodiment, an identifier associated with a UWB system corresponds to a media access control (MAC) address. In response to the first ranging message, the first UWB anchor 110 may be further configured to receive a first ranging response message from the user device 104. Based on the first ranging response message, the first ranging message of a subsequent ranging session is modified.

The first secure element 112 may include suitable circuitry that may be configured to perform one or more operations. For example, the first secure element 112 may be configured to store sensitive information, such as authentication credentials, cryptographic keys, or the like. The sensitive information may be utilized to authenticate the user device 104 (e.g., the user 102) when an operation is initiated between the user device 104 and the entry control device 106a.

The first control circuit 114 may include suitable circuitry that may be configured to perform one or more operations. For example, the first control circuit 114 may be configured to detect the presence of user devices within a coverage range of the entry control device 106a. The coverage range defines a range within which the entry control device 106a triggers user devices for UWB communication. Thus, when the user device 104 is within the coverage range of the entry control device 106a, the first control circuit 114 may be further configured to generate a first set-up message and transmit the first set-up message to the user device 104. In an embodiment, the first set-up message corresponds to a Bluetooth Low Energy (BLE) message. The first set-up message may include a channel frequency, an ID of the entry control device 106a, or the like. The UWB system 128 of the user device 104 is triggered based on the reception of the first set-up message.

The entry control device 106a may have an operational range associated therewith. The operational range defines a range within which the entry control device 106a executes operations with user devices. Thus, when the user device 104 is within an operational range of the entry control device 106a, the first control circuit 114 may be further configured to generate an authentication request to authenticate the user device 104 (e.g., the user 102) and transmit the authentication request to the user device 104. In response, the first control circuit 114 may be further configured to receive an authentication response from the user device 104. The authentication response may include details of the user 102, details of the user device 104, details of a transaction to be executed, or the like. The first control circuit 114 may be further configured to validate the authentication response based on the sensitive information stored in the first secure element 112. Based on successful validation, the first control circuit 114 may be further configured to grant access to the user 102. For example, in the metro scenario, the first control circuit 114 may execute a financial transaction with a financial account of the user 102 before allowing the user 102 to enter the metro platform. The operation between the user device 104 and the entry control device 106a is thus enabled.

The second UWB anchor 118, the second secure element 120, and the second control circuit 122 of the exit control device 106b may operate in a manner similar to the first UWB anchor 110, the first secure element 112, and the first control circuit 114, respectively, as described above.

The entry and exit control devices 106a and 106b may communicate with the user device 104 to enable spatial detection of the user device 104, and in turn, execute an operation (e.g., an access operation, a transaction operation, or the like) with the user device 104. The device processor 126 and the UWB system 128 are included in the user device 104 to facilitate such operations.

The device processor 126 may include suitable circuitry that may be configured to perform one or more operations. For example, the device processor 126 may be configured to facilitate the installation of various applications (such as a transit application, a payment application, or the like) on the user device 104. When the user device 104 is within the coverage range of the entry and exit control devices 106a and 106b, the device processor 126 may be further configured to receive the first set-up message and a second set-up message generated by the entry and exit control devices 106a and 106b, respectively. Based on the first and second set-up messages, the device processor 126 may be further configured to generate first and second wake-up messages and transmit the first and second wake-up messages to the UWB system 128. Each wake-up message triggers UWB communication between the UWB system 128 and the corresponding access control device.

The UWB system 128 may be activated based on the first and second wake-up messages. Further, the UWB system 128 may be configured to communicate with other UWB-enabled devices (such as the plurality of access control devices 106a and 106b) using the UWB communication technique of the present disclosure. The processing circuit 132, the memory 134, and the communication circuit 136 are included in the UWB system 128 to enable the implementation of the UWB communication technique of the present disclosure.

The processing circuit 132 may include suitable circuitry that may be configured to perform one or more operations. When the user 102 enters the metro station, the user device 104 may be within the coverage range of each of the entry and exit control devices 106a and 106b. The device processor 126 may thus receive the first and second set-up messages, and in turn, may generate the first and second wake-up messages, respectively. Thus, the processing circuit 132 may be configured to receive, for the entry and exit control devices 106a and 106b, the first and second wake-up messages when the UWB system 128 (e.g., the user device 104) is within the coverage range of the entry and exit control devices 106a and 106b, respectively. The processing circuit 132 may be further configured to create first and second ranging sessions for the entry and exit control devices 106a and 106b based on the receipt of the first and second wake-up messages, respectively. Two ranging sessions (one for entry and one for exit) are created as whether the user 102 is entering or exiting the metro platform is unknown.

The processing circuit 132 may be further configured to schedule the first and second ranging sessions, based on the creation thereof, to receive the first ranging initiation message associated with the first UWB anchor 110 and a second ranging initiation message associated with the second UWB anchor 118. The processing circuit 132 may receive the first and second ranging initiation messages from the first and second UWB anchors 110 and 118, respectively, by way of the communication circuit 136 and the communication network 108. The first and second ranging sessions are scheduled in a sequential manner, with each ranging session being scheduled until a corresponding ranging initiation message is received. The processing circuit 132 may be further configured to identify whether the first and second ranging initiation messages are overlapping based on the receipt thereof. For the sake of ongoing discussion, it is assumed that the first and second ranging initiation messages are overlapping. The processing circuit 132 may be further configured to determine that the entry and exit control devices 106a and 106b are asynchronous based on the identification that the first and second ranging initiation messages are overlapping.

Based on the determination that the entry and exit control devices 106a and 106b are asynchronous, the processing circuit 132 may be further configured to assign first and second priority values to the first and second ranging sessions such that the first and second priority values are equal. The equal priority values indicate that both the ranging sessions are given the same priority at the beginning of the UWB communication. The processing circuit 132 may be further configured to schedule the first and second ranging sessions based on the first and second priority values. In other words, the first and second ranging sessions are scheduled in consecutive time blocks repeatedly until there is a change in the first priority value and/or the second priority value.

During each ranging session, the processing circuit 132 may be further configured to receive a ranging message associated with a corresponding UWB anchor and update a priority value of each ranging session based on the presence or absence of an identifier associated with the UWB system 128 in the RML of the ranging message received during the corresponding ranging session. In an embodiment, the identifier associated with the UWB system 128 corresponds to the MAC address associated therewith. The update of the priority value of each ranging session corresponds to an increment of the priority value when the identifier associated with the UWB system 128 is present in the RML of the ranging message received during the corresponding ranging session. In an embodiment, the RML includes a plurality of slots, with each slot corresponding to a unique update value. When the identifier associated with the UWB system 128 is present in one of the plurality of slots, the priority value of the corresponding ranging session is updated by the corresponding unique update value. Further, the update of the priority value of each ranging session corresponds to a decrement of the priority value when the identifier associated with the UWB system 128 is absent in the RML of the ranging message received during the corresponding ranging session. The priority value of each ranging session may be further decremented when the identifier associated with the UWB system is present in the RML of at least one ranging message received during at least one preceding ranging session associated with a different UWB anchor. The processing circuit 132 may be further configured to schedule the first and second ranging sessions based on the updated priority value to dynamically prioritize one of the plurality of access control devices 106a and 106b.

Initially, the identifier associated with the UWB system 128 may be absent in the first RML of the first ranging message as well as in a second RML of a second ranging message generated by the second UWB anchor 118. The first and second priority values may thus remain equal. In such a scenario, the ranging sessions correspond to fine ranging (FiRa) contention-based UWB ranging sessions. During each ranging session, the processing circuit 132 may be configured to generate and transmit, in response to the received ranging message, a ranging response message to the corresponding UWB anchor by way of the communication circuit 136 and the communication network 108. The ranging response message may include a reply time associated with the UWB system 128 (e.g., a time difference between the message and the response). Based on the ranging response message received during each ranging session, the corresponding UWB anchor may be configured to perform distance estimations (e.g., determine whether the UWB system 128 is within the access control range). Thus, based on the ranging response message received during each ranging session, the identifier associated with the UWB system 128 may be included in the RML of the ranging message of a subsequent ranging session.

Each slot of the RML further corresponds to a unique frequency channel. When the identifier associated with the UWB system 128 is not present in the first and second RMLs, the processing circuit 132 may generate and transmit the first ranging response message and a second ranging response message to the first and second UWB anchors 110 and 118 in frequency channels that are different from those included in the first and second RMLs, respectively. These frequency channels correspond to contention access periods of the first and second ranging messages. When the UWB system 128 (e.g., the user device 104) is within the access control range of at least one of the entry and exit control devices 106a and 106b, the identifier associated with the UWB system 128 may be included in the RML of the corresponding ranging message. In such a scenario, the processing circuit 132 may increment the priority value of the corresponding ranging session. Further, the processing circuit 132 may transmit the ranging response message in a frequency channel specified by the slot that includes the identifier associated with the UWB system 128. The processing circuit 132 may then schedule the first and second ranging sessions based on the updated priority value to dynamically prioritize one access control device (e.g., whose RML includes the identifier associated with the UWB system 128).

The dynamic prioritization of one access control device corresponds to scheduling of a corresponding ranging session a plurality of times in a sequential manner. Based on the dynamic prioritization of one of the plurality of access control devices 106a and 106b, the operation between the UWB system 128 and the corresponding access control device is enabled. In other words, an access control device associated with the ranging session having the highest priority value is dynamically prioritized to enable the operation between the UWB system 128 and the corresponding access control device. The operation corresponds to an access control operation, a transaction operation, or the like.

Thus, when one access control device is prioritized, the processing circuit 132 schedules the corresponding ranging session multiple times in a sequential manner, with a distance between the UWB system 128 and the corresponding access control device being determined for each ranging session by the corresponding access control device (e.g., the UWB anchor of the corresponding access control device). Hence, as the distance between the UWB system 128 and one access control device reduces, the corresponding ranging session is prioritized to enable the corresponding access control device to transact with the user device 104. For example, during one of the prioritized ranging sessions, if the access control device determines that the UWB system 128 is within the operational range, the associated control circuit may generate the authentication request and transmit the authentication request to the UWB system 128. The processing circuit 132 may thus be further configured to receive the authentication request associated with the control circuit of the access control device that is prioritized, generate the authentication response based on the authentication request, and transmit the authentication response to the control circuit of the access control device that is prioritized.

The reception and transmission operations may be executed by way of the communication circuit 136 and the communication network 108. The operation between the UWB system 128 and the corresponding access control device is enabled based on the authentication response. The dynamic prioritization of one of the first and second ranging sessions is explained in detail in conjunction with FIGS. 3A-3H.

The memory 134 may include suitable circuitry that may be configured to perform one or more operations. For example, the memory 134 may be configured to store the ranging messages received from the plurality of access control devices 106a and 106b.

The communication circuit 136 may include suitable circuitry that may be configured to perform one or more operations. For example, the communication circuit 136 may be configured to enable communication between the UWB system 128 (e.g., the processing circuit 132) and the first and second UWB anchors 110 and 118 by way of the communication network 108.

Although FIG. 1 describes the service provider to be the city metro, the scope of the present disclosure is not limited to it. The dynamic prioritization of ranging sessions of the present disclosure may be implemented for various other applications, without deviating from the scope of the present disclosure.

The scope of the present disclosure is not limited to the ranging initiation message and the ranging message being separate messages. In other embodiments, the ranging initiation message and the ranging message may be part of a single message, without deviating from the scope of the present disclosure.

Although it is described that the processing circuit 132 generates the authentication response, the scope of the present disclosure is not limited to it. In an alternate embodiment, the authentication request may be received by the device processor 126 and the authentication response may be generated by the device processor 126.

The scope of the present disclosure is not limited to the processing circuit 132 creating two ranging sessions. In other embodiments, the number of access control devices may be more than two, and thus, the processing circuit 132 may create more than two ranging sessions.

The UWB environment 100 of FIG. 1 is shown to include a single user and a single user device to keep the illustrations concise and clear and should not be considered a limitation of the present disclosure. The UWB environment 100 may include two or more users and associated two or more user devices, with each user device operating in a similar manner as described above. Thus, at any instance, each of the plurality of access control devices 106a and 106b may interact with more than one UWB system and execute transactions with the UWB systems that are within the corresponding operation range.

The ranging message generated by the UWB anchor is not limited to including the RML and the ranging response message generated by the UWB system 128 is not limited to including the reply time. The ranging message and the ranging response message may include various other parts.

Figure 2:
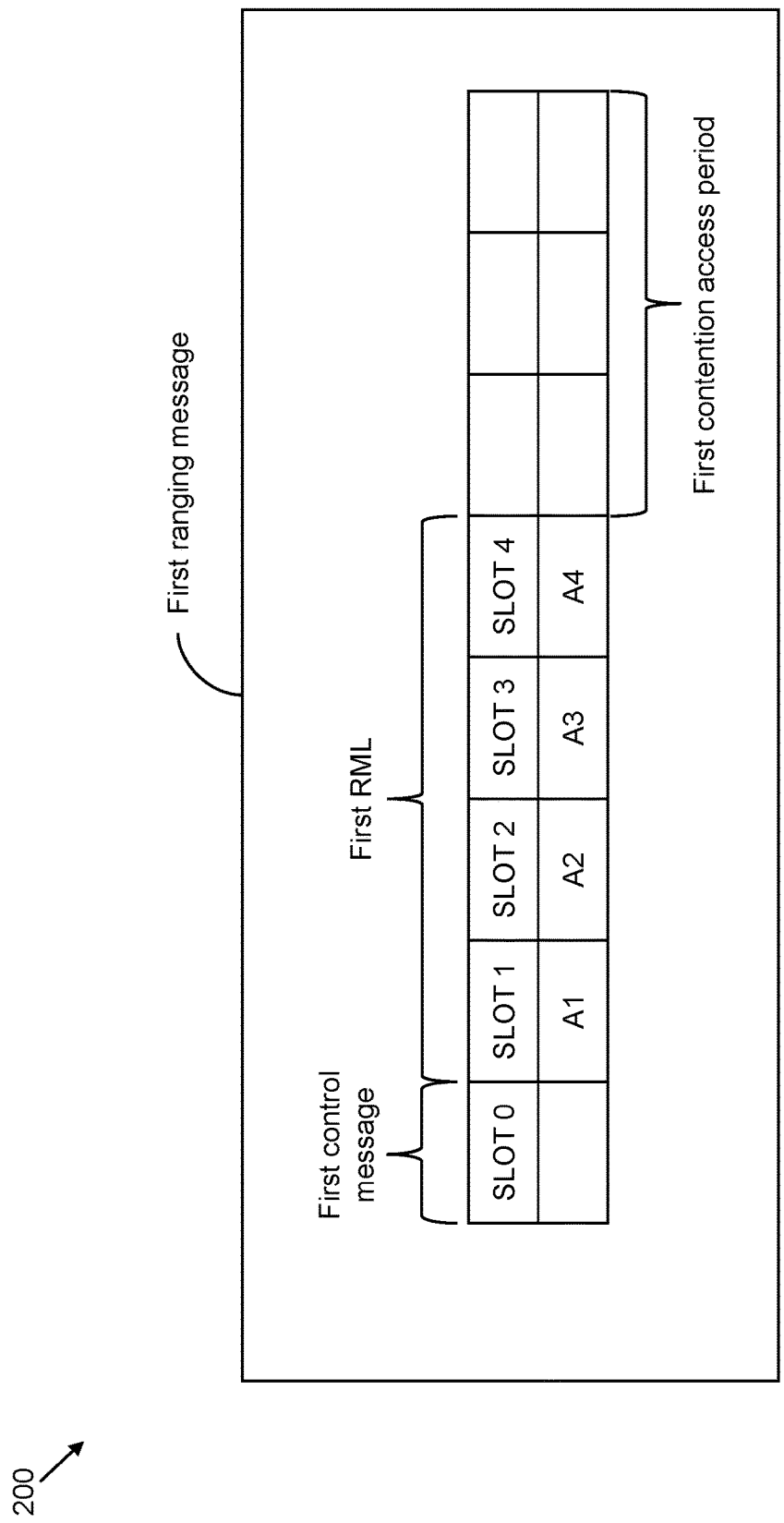
FIG. 2 illustrates a schematic diagram of a first ranging message in accordance with an embodiment of the present disclosure.

The first ranging message generated by the first UWB anchor 110 is illustrated and described in conjunction with FIG. 2. The second ranging message generated by the second UWB anchor 118 may be structurally and functionally similar to the first ranging message.

FIG. 2 illustrates a schematic diagram 200 of the first ranging message in accordance with an embodiment of the present disclosure. The first ranging message may include a first control message, a first RML, and a first contention access period.

The first ranging message may include various slots. Slot 0 corresponds to the first control message. The first control message may include details of the first UWB anchor 110 and the number of slots the first RML may contain. Slot 1, slot 2, slot 3, and slot 4 may correspond to a first plurality of slots of the first RML.

Each slot of the first RML is indicative of the distance between a user device and the first UWB anchor 110. The first UWB anchor 110 may reserve a slot in the first RML when a user device is within the access control range thereof. The slot that is reserved may depend on the distance between the user device and the entry control device 106a (e.g., the first UWB anchor 110). The first UWB anchor 110 reserves the slot for a user device by utilizing an identifier associated with the UWB system of the user device. As illustrated in FIG. 2, the slot 1, slot 2, slot 3, and slot 4 may include identifiers A1, A2, A3, and A4 associated with four UWB systems that are associated with the first UWB anchor 110 (e.g., the entry control device 106a). The slots are indicative of the nearness of the UWB systems to the first UWB anchor 110. Thus, among the four UWB systems, the UWB system having the identifier A1 is closest to the first UWB anchor 110, whereas the UWB system having the identifier A4 is farthest from the first UWB anchor 110.

Although not shown, each slot has a unique update value. The priority values of the ranging sessions of UWB systems having the identifiers A1, A2, A3, and A4 are updated based on the corresponding update value, with the update value associated with the identifier A1 being the highest and the update value associated with the identifier A4 being the lowest. Each slot further has a unique frequency channel associated therewith. The UWB systems having the identifiers A1, A2, A3, and A4 may transmit the corresponding ranging response message to the first UWB anchor 110 in the unique frequency channel of slot 1, slot 2, slot 3, and slot 4, respectively.

The second RML of the second ranging message may similarly include a second plurality of slots that may be structurally and functionally similar to the first plurality of slots of the first RML.

The slots (not labeled) following the first RML correspond to the first contention access period. These slots may be utilized by the UWB systems whose identifiers are not included in the first RML. Such UWB systems may execute the FiRa contention-based ranging sessions with the first UWB anchor 110, until the UWB systems are within the access control range of the first UWB anchor 110.

FIGS. 3A-3H are diagrams that illustrate exemplary scenarios 300A-300H in which one access control device is dynamically prioritized in accordance with an embodiment of the present disclosure. In the exemplary scenarios 300A-300H, the service provider is the city metro.

In the exemplary scenario 300A with regards to FIG. 3A, the user 102 enters the metro station and the user device 104 may be within the coverage range of both the entry and exit control devices 106a and 106b. Thus, the processing circuit 132 may receive the first and second wake-up messages for the entry and exit control devices 106a and 106b, and consequently, create the first and second ranging sessions for the entry and exit control devices 106a and 106b, respectively.

The processing circuit 132 may schedule the first and second ranging sessions to receive the first and second ranging initiation messages, respectively. The first and second ranging sessions are scheduled in a sequential manner, with each ranging session being scheduled until a corresponding ranging initiation message is received. For the sake of ongoing discussion, it is assumed that the first and second ranging initiation messages are overlapping. Thus, the processing circuit 132 may determine that the entry and exit control devices 106a and 106b are asynchronous and assign the first and second priority values that are equal to the first and second ranging sessions, respectively. These operations are not illustrated in FIGS. 3A-3H to keep the illustrations concise and clear and should not be considered a limitation of the present disclosure.

Figure 3B:
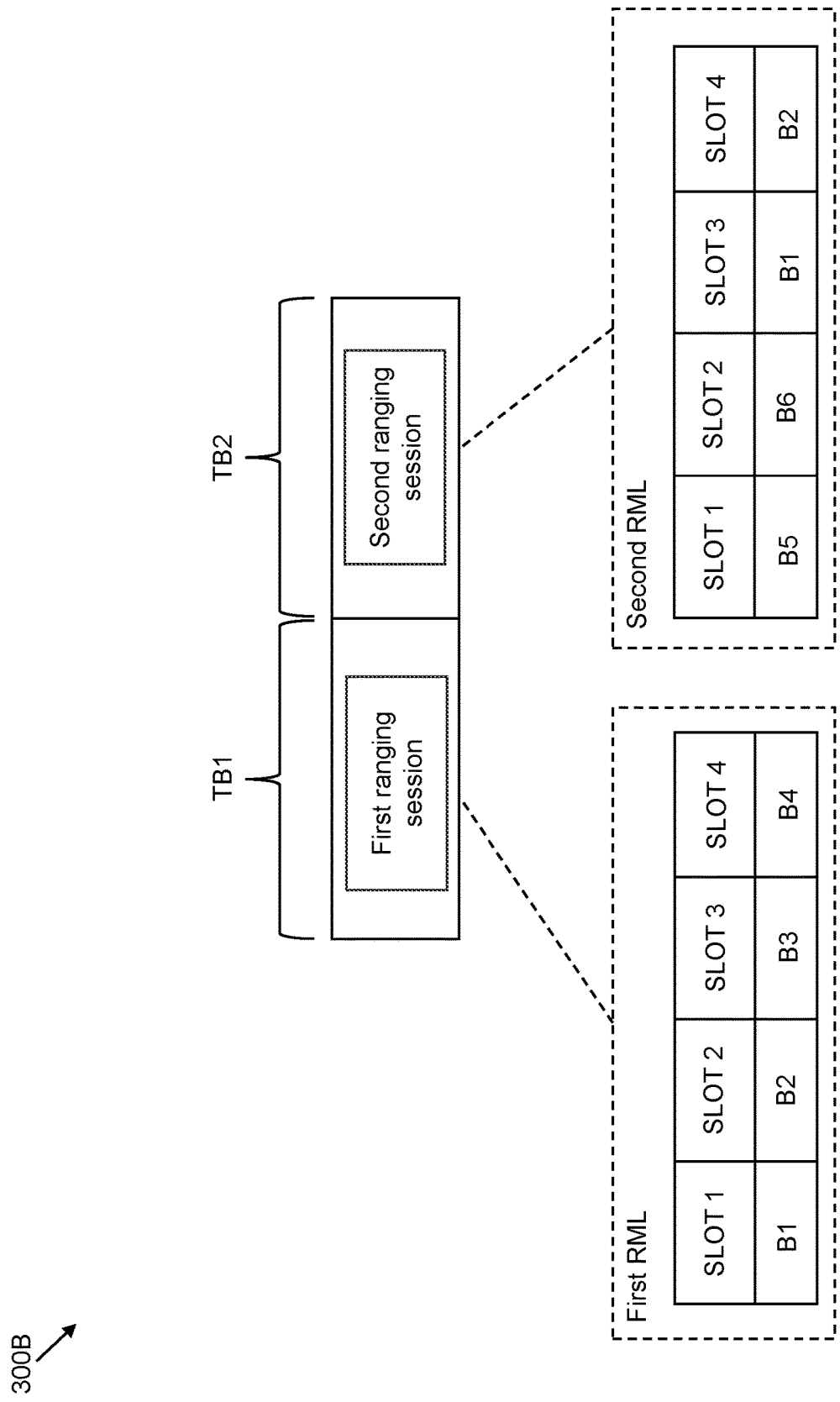

In the exemplary scenario 300B with regards to FIG. 3B, the processing circuit 132 may schedule the first and second ranging sessions based on equal priority values. In other words, the first and second ranging sessions are scheduled in consecutive time blocks (e.g., time blocks TB1 and TB2) repeatedly until there is a change in the first priority value and/or the second priority value. The first and second ranging messages are received during the first and second ranging sessions of time blocks TB1 and TB2, respectively. The first and second ranging messages may be continuously transmitted by the first and second UWB anchors 110 and 118, respectively, however, the UWB system 128 (e.g., the processing circuit 132) may receive a particular ranging message exclusively when the corresponding ranging session is scheduled. For example, when the first ranging session is scheduled, the processing circuit 132 may receive the first ranging message and may ignore other ranging messages (e.g., the second ranging message) transmitted by other UWB anchors (e.g., the second UWB anchor 118).

As illustrated in FIG. 3B, the first and second RMLs of the first and second ranging messages do not include the identifier associated with the UWB system 128 (for the sake of ongoing discussion, it is assumed that the identifier associated with the UWB system 128 is C1). During these ranging sessions, the processing circuit 132 may still respond to the first and second ranging messages in the corresponding contention access periods which enables the first and second UWB anchors 110 and 118 to perform distance estimations for the user device 104, respectively.

Figure 3C:
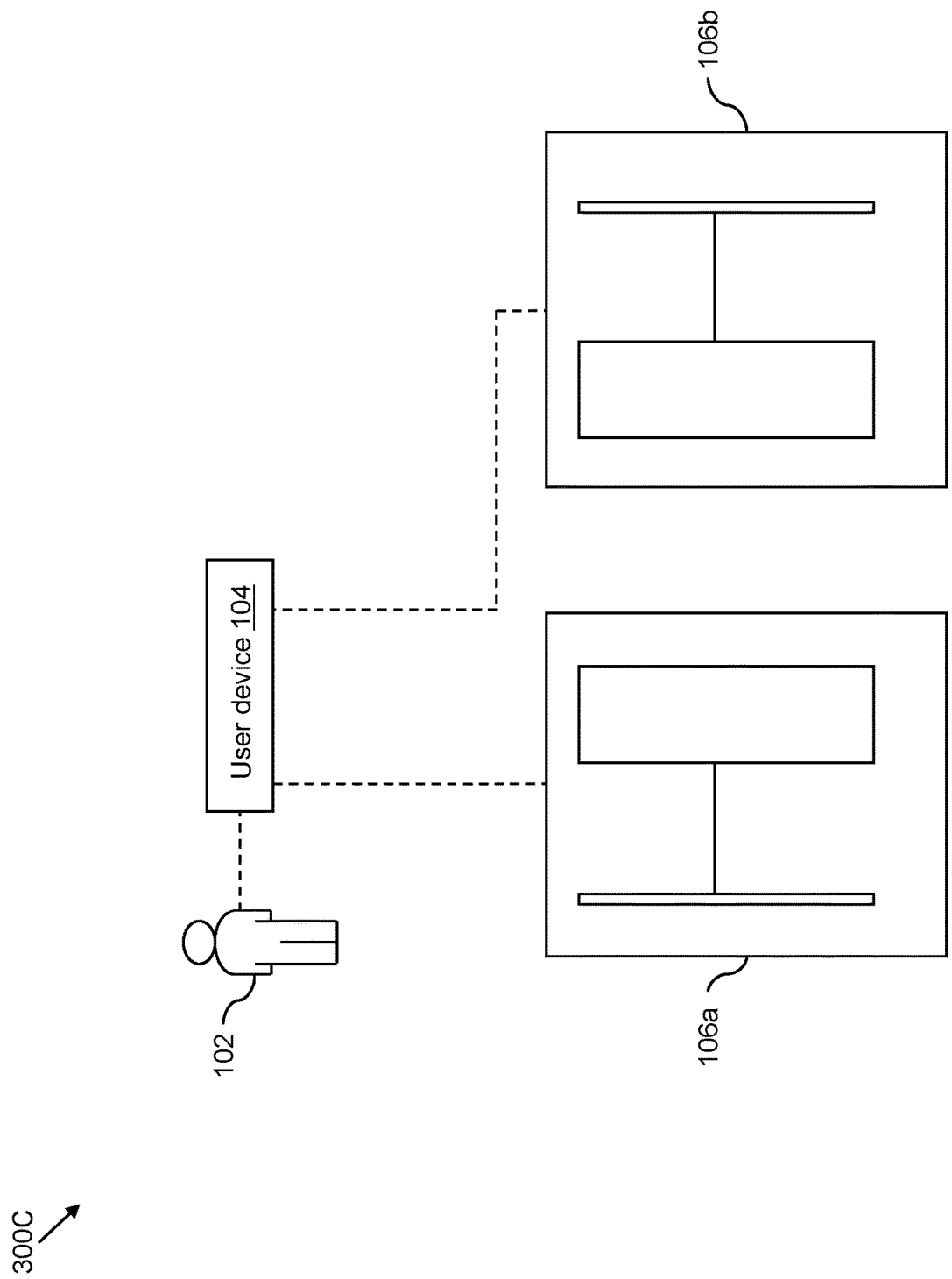

In the exemplary scenario 300C with regards to FIG. 3C, the user 102, and in turn, the user device 104 may move closer to the entry control device 106a and may be within the access control range of the first UWB anchor 110 (e.g., the entry control device 106a). The access control range associated with an access control device is thus less than the coverage range associated therewith. The first UWB anchor 110 may determine that the user device 104 is within the access control range based on the first ranging response message received during the latest ranging session. Thus, the first UWB anchor 110 may include the identifier C1 in the first RML of the first ranging message. The user device 104 may not be within the access control range of the second UWB anchor 118, and hence, the second RML of the second ranging message may not include the identifier C1.

Figure 3D:
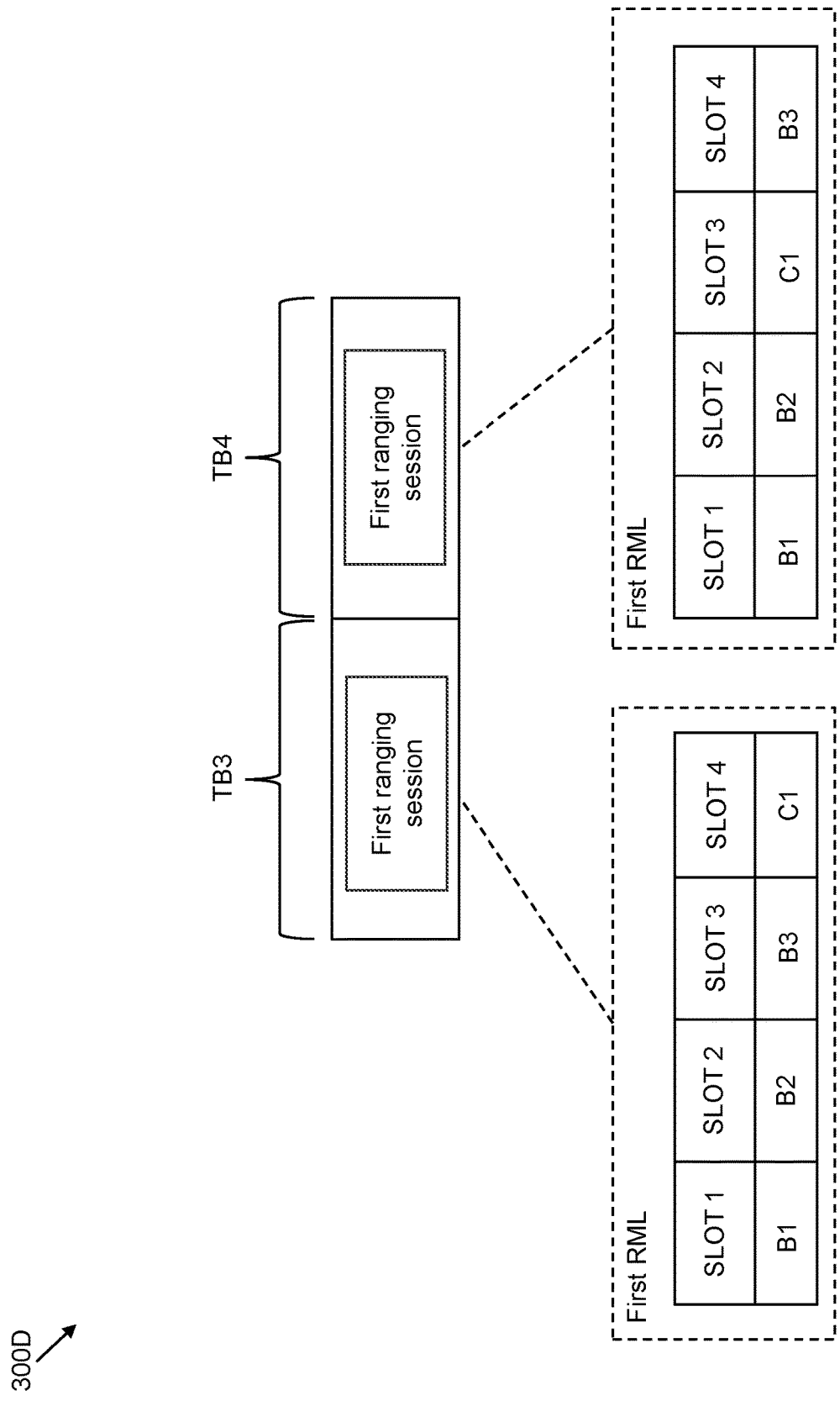

In the exemplary scenario 300D with regards to FIG. 3D, the processing circuit 132 schedules the first ranging session in a time block TB3 and receives the first ranging message. As the first RML includes the identifier C1, the processing circuit 132 updates (e.g., increments) the first priority value such that the first priority value is greater than the second priority value. As the first priority value is incremented, the processing circuit 132 schedules the first ranging session again in a time block TB4 that is subsequent to the time block TB3, thereby dynamically prioritizing the entry control device 106a. If the identifier C1 is present in the first RML received during the time block TB4 (which is the case as illustrated in FIG. 3D), the first priority value may be further incremented or retained.

Figure 3E:
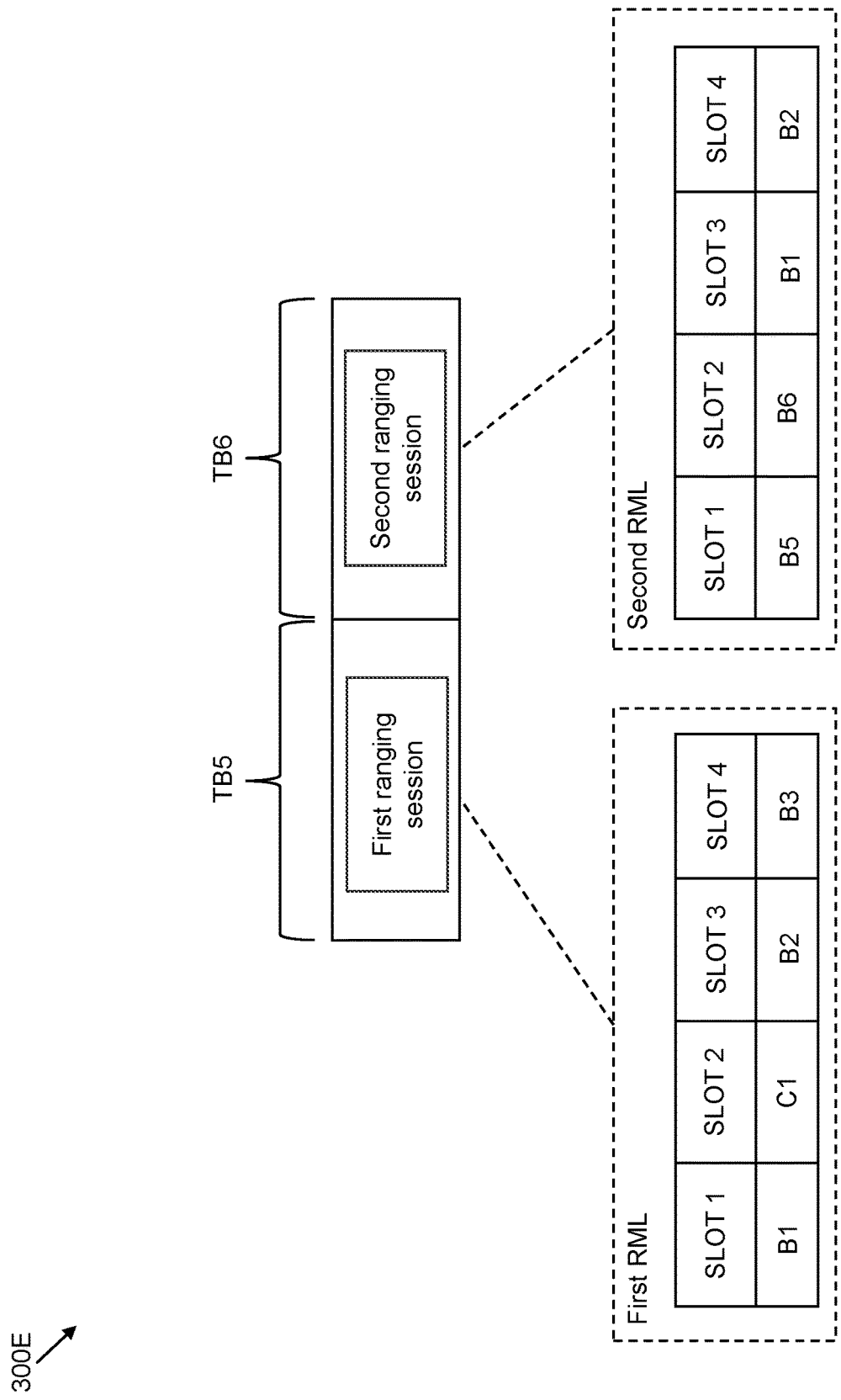

In the exemplary scenario 300E with regards to FIG. 3E, the processing circuit 132 schedules the first ranging session again in a time block TB5 that is subsequent to the time block TB4. If the identifier C1 is present in the first RML received during the time block TB5 (which is the case as illustrated in FIG. 3E), the first priority value may be further incremented or retained. However, during a time block TB6 that is subsequent to the time block TB5, the processing circuit 132 may schedule the second ranging session. At the end of time block TB5, a predefined time duration lapses which triggers the processing circuit 132 to schedule the second ranging session instead of the first ranging session. The predefined time duration corresponds to a predefined number of time blocks for which one ranging session (e.g., the first ranging session in this example) is scheduled sequentially. The predefined time duration thus ensures that no access control device is starved ranging with the UWB system 128, even if the access control device is not the desired one. This ensures that if the user 102 suddenly changes the route and starts moving towards the exit control device 106b, the UWB system 128 and the exit control device 106b may be able to detect the route change.

When the second ranging session is scheduled, the processing circuit 132 receives the second ranging message and decrements the second priority value as the identifier C1 is absent in the second RML. The decrement of the second priority value further enables the dynamic prioritization of the entry control device 106a. The decrement may also be a function of the first RML, received during the time block TB5, including the identifier C1. Thus, the UWB communication technique of the present disclosure determines which gate the user 102 is approaching based on the presence of the MAC address of the user device 104 in the RML of the ranging message generated by each gate (e.g., the access control device of each gate) and prioritizes the corresponding ranging session to enable the gate to accurately detect and transact with the user device 104, and consequently, grant access to the user 102 in a swift manner.

Figure 3F:
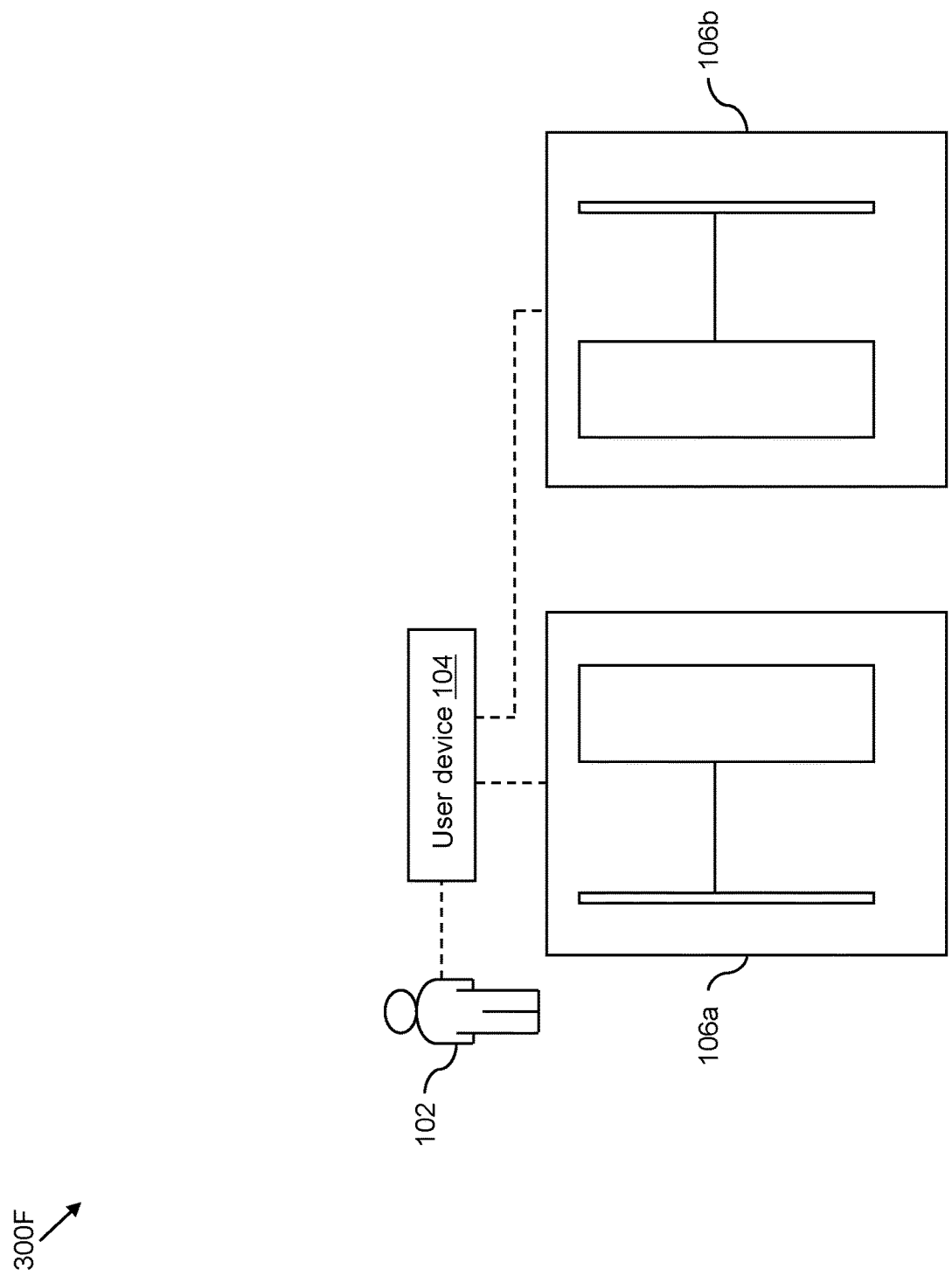

In the exemplary scenario 300F with regards to FIG. 3F, the user 102, and in turn, the user device 104 may move even closer to the entry control device 106a and may be within the operational range of the entry control device 106a. The operational range is thus less than the access control range. In an example, the operational range may be equal to 0-1.5 m, the access control range may be equal to 1.5-6 m, and the coverage range may be equal to 6-20 m. However, the values of the operational range, the access control range, and the coverage range may be different in other embodiments. The user device 104 may also be within the access control range of the second UWB anchor 118, and the second UWB anchor 118 may include the identifier C1 in the second RML of the second ranging message. However, with the decrement of the second priority value, the first ranging session may be significantly prioritized, and the inclusion of the identifier C1 in the second RML may not alter the scheduling.

Figure 3G:
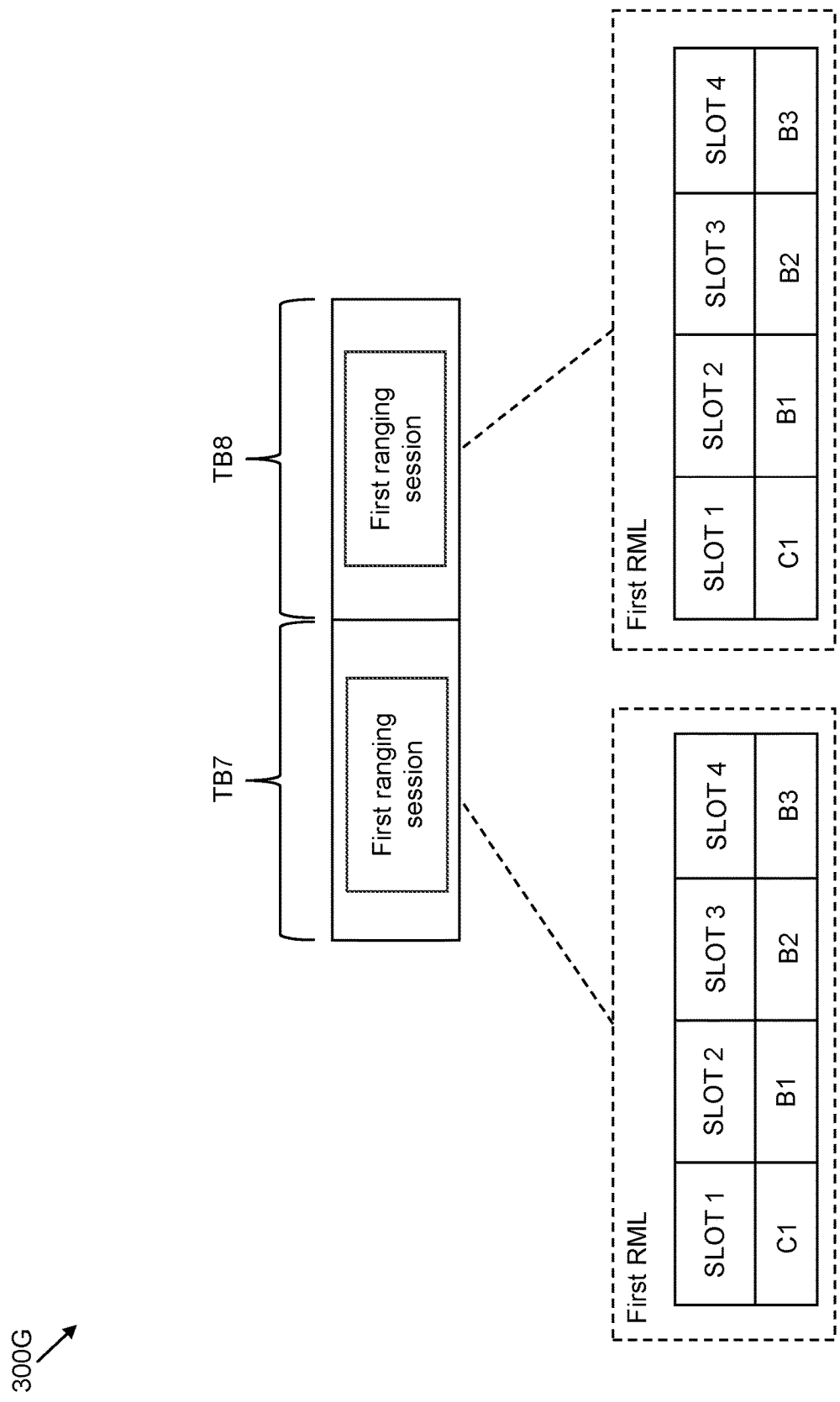

In the exemplary scenario 300G with regards to FIG. 3G, the processing circuit 132 schedules the first ranging session in a time block TB7 that is subsequent to the time block TB6. As the identifier C1 is present in the slot 1 of the first RML received during the time block TB7, the first priority value is further incremented and the processing circuit 132 schedules the first ranging session again in a time block TB8 that is subsequent to the time block TB7. During these ranging sessions, the processing circuit 132 may receive the authentication request generated by the first control circuit 114, generate the authentication response, and transmit the authentication response to the first control circuit 114. The first control circuit 114 may execute the access control operation based on the authentication response. In other words, the entry gate may be opened.

Figure 3H:
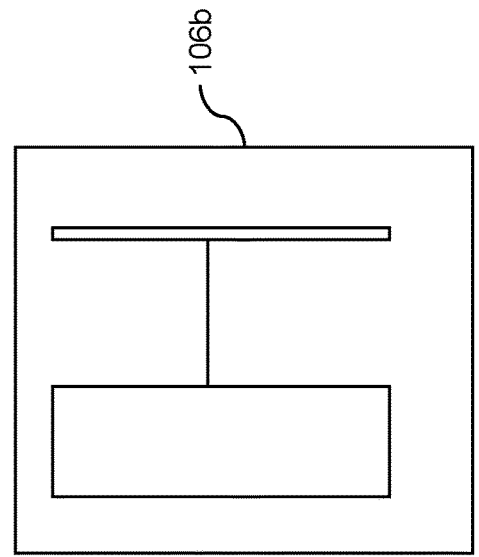
Figure 3H:
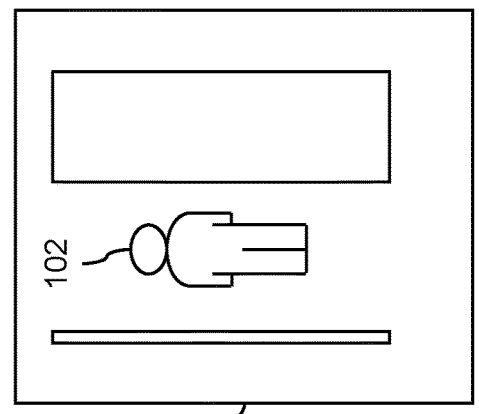

In the exemplary scenario 300H with regards to FIG. 3H, the entry gate controlled by the entry control device 106a may be opened, and the user 102 may pass through the entry gate to avail the transportation services.

Although it is described that the second RML does not include the identifier C1 during the time block TB6, the scope of the present disclosure is not limited to it. In an alternate embodiment, the second RML may include the identifier C1 at slot 4 during the time block TB6. In such a scenario, the processing circuit 132 may increment the second priority value as the identifier C1 is present in the second RML. The increment in the priority value is proportional to the position of the identifier C1 in the RML. For example, as the identifier C1 is present at a higher slot in the first RML as compared to the second RML (slot 2 as compared to slot 4), an increment of the first priority value is greater than that of the second priority value, thereby dynamically prioritizing the entry control device 106a.

Figure 4A:
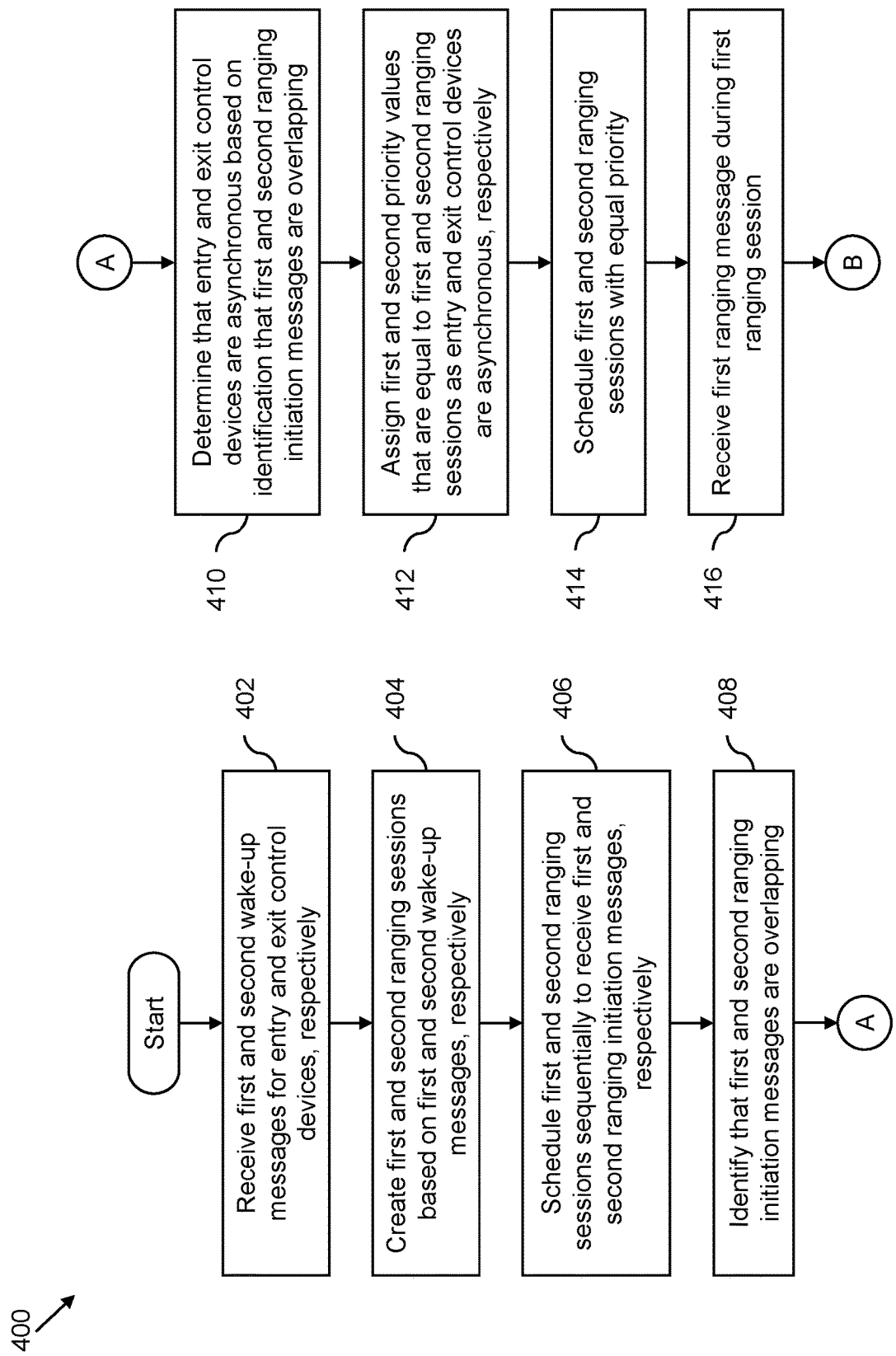
FIGS. 4A and 4B, collectively, represent a flowchart that illustrates a UWB communication method in accordance with an embodiment of the present disclosure.
Figure 4B:
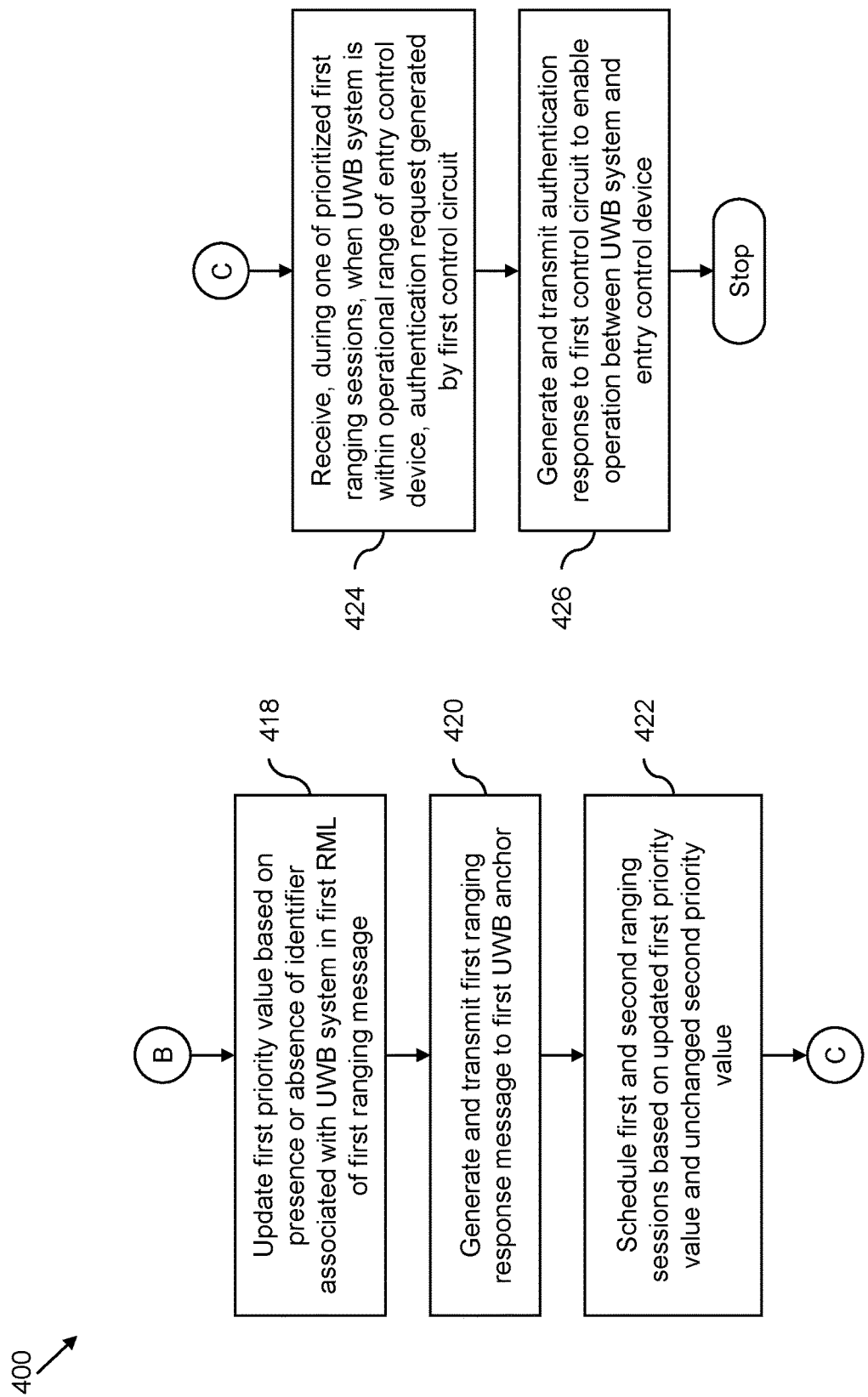

FIGS. 4A and 4B, collectively, represent a flowchart 400 that illustrates the UWB communication method in accordance with an embodiment of the present disclosure. The flowchart 400 describes the operations performed by the UWB system 128.

Referring to FIG. 4A, at step 402, the processing circuit 132 may receive the first and second wake-up messages for the entry and exit control devices 106a and 106b, respectively. The processing circuit 132 may receive the first and second wake-up messages from the device processor 126 when the user device 104 is within the coverage range of the entry and exit control devices 106a and 106b, respectively.

At step 404, the processing circuit 132 may create the first and second ranging sessions for the entry and exit control devices 106a and 106b based on the first and second wake-up messages, respectively. At step 406, the processing circuit 132 may schedule the first and second ranging sessions sequentially to receive the first and second ranging initiation messages associated with the first and second UWB anchors 110 and 118, respectively. Each ranging session is scheduled until the corresponding ranging initiation message is received. At step 408, the processing circuit 132 may identify that the first and second ranging initiation messages are overlapping. At step 410, the processing circuit 132 may determine that the entry and exit control devices 106a and 106b are asynchronous based on the identification that the first and second ranging initiation messages are overlapping.

At step 412, the processing circuit 132 may assign the first and second priority values that are equal to the first and second ranging sessions as the entry and exit control devices 106a and 106b are asynchronous, respectively. At step 414, the processing circuit 132 may schedule the first and second ranging sessions with equal priority. In other words, the first and second ranging sessions are scheduled in consecutive time blocks repeatedly until there is a change in the first priority value and/or the second priority value. At step 416, the processing circuit 132 may receive the first ranging message during the first ranging session.

Referring now to FIG. 4B, at step 418, the processing circuit 132 may update the first priority value based on the presence or absence of the identifier associated with the UWB system 128 in the first RML of the first ranging message. At step 420, the processing circuit 132 may generate and transmit the first ranging response message to the first UWB anchor 110. The processing circuit 132 may transmit the first ranging response message to the first UWB anchor 110 by way of the communication circuit 136 and as a response to the first ranging message. At step 422, the processing circuit 132 may schedule the first and second ranging sessions based on the updated first priority value and the unchanged second priority value. For the sake of ongoing discussion, it is assumed that the identifier associated with the UWB system 128 is present in the first RML, and hence, the first priority value is greater than the second priority value. Thus, the scheduling of the first and second ranging sessions based on the updated first priority value and the unchanged second priority value corresponds to dynamically prioritizing the first ranging session over the second ranging session. In other words, the processing circuit 132 schedules the first ranging session multiple times in a sequential manner.

At step 424, the processing circuit 132 may receive, during one of the prioritized first ranging sessions, when the UWB system 128 is within the operational range of the entry control device 106*a*, the authentication request generated by the first control circuit 114. At step 426, the processing circuit 132 may generate and transmit the authentication response to the first control circuit 114 to enable the operation between the UWB system 128 and the entry control device 106*a*. The processing circuit 132 may transmit the authentication response to the first control circuit 114 by way of the communication circuit 136.

The scope of the present disclosure is not limited to the entry operation. Similar operations as described above may be executed during the exit, without deviating from the scope of the present disclosure.

Thus, the UWB communication technique of the present disclosure utilizes the RML of the ranging message to dynamically prioritize the interaction of the user device 104 with one access control device and to ensure neighboring access control devices do not cause interference or collisions. This is in contrast to a conventional solution where DL-TDoA networks and additional UWB anchors (e.g., apart from the ones included in the access control devices) are deployed to synchronize the asynchronous access control devices. As the UWB communication technique of the present disclosure does not require the deployment of massive networks or a large number of UWB anchors, the UWB communication technique of the present disclosure is cost-effective and can be implemented in current transit and other access control operations without adding a huge strain on the operational costs. Additionally, the dynamic prioritization of the desired access control device results in the user 102 (e.g., the user device 104) being granted access in a swift manner, thereby significantly improving the user experience. Further, the UWB communication technique of the present disclosure does not require the user device 104 to perform any distance estimates, as the presence of the identifier in the RML is indicative of the nearness of the user device 104 to the access control device. Consequently, the UWB communication technique of the present disclosure can be implemented in scenarios where user devices are incapable of performing distance estimates.

The detailed description of the appended drawings is intended as a description of the embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

In an embodiment of the present disclosure, an ultra-wideband (UWB) system is disclosed. The UWB system includes a processing circuit. The processing circuit is configured to create a plurality of ranging sessions for a plurality of access control devices associated with the UWB system. A plurality of UWB anchors, of the plurality of access control devices, are asynchronous. A plurality of priority values of the plurality of ranging sessions are equal. The processing circuit is further configured to schedule the plurality of ranging sessions based on the plurality of priority values. During each ranging session, the processing circuit is further configured to receive a ranging message associated with a corresponding UWB anchor. The ranging message comprises a ranging management list (RML) that includes a plurality of identifiers associated with a plurality of UWB systems that are within an access control range of the corresponding UWB anchor. The processing circuit is further configured to update a priority value of each ranging session based on one of a presence and an absence of an identifier associated with the UWB system in the RML of the ranging message received during the corresponding ranging session. Further, the processing circuit is configured to schedule the plurality of ranging sessions based on the updated priority value to dynamically prioritize one of the plurality of access control devices. Based on the dynamic prioritization of one of the plurality of access control devices, an operation between the UWB system and the corresponding access control device is enabled.

In some embodiments, the processing circuit is further configured to receive, for each access control device of the plurality of access control devices, a wake-up message when the UWB system is within a coverage range of the corresponding access control device. Each ranging session of the plurality of ranging sessions is created based on the receipt of the corresponding wake-up message.

In some embodiments, the processing circuit is further configured to schedule the plurality of ranging sessions, based on the creation thereof, to receive a plurality of ranging initiation messages associated with the plurality of UWB anchors. The plurality of ranging sessions are scheduled in a sequential manner, with each ranging session being scheduled until a corresponding ranging initiation message is received. The processing circuit is further configured to identify whether the plurality of ranging initiation messages are overlapping based on the receipt thereof, determine that the plurality of access control devices are asynchronous based on the identification that the plurality of ranging initiation messages are overlapping, and assign the plurality of priority values, that are equal, to the plurality of ranging sessions based on the determination that the plurality of access control devices are asynchronous.

In some embodiments, the update of the priority value of each ranging session corresponds to an increment of the priority value when the identifier associated with the UWB system is present in the RML of the ranging message received during the corresponding ranging session.

In some embodiments, the update of the priority value of each ranging session corresponds to a decrement of the priority value when the identifier associated with the UWB system is absent in the RML of the ranging message received during the corresponding ranging session.

In some embodiments, the priority value of each ranging session is further decremented when the identifier associated with the UWB system is present in the RML of at least one ranging message received during at least one preceding ranging session associated with a different UWB anchor.

In some embodiments, the RML, of the ranging message received during each ranging session, comprises a plurality of slots associated with the plurality of UWB systems such that the plurality of slots are indicative of nearness of the plurality of UWB systems to the corresponding UWB anchor. Each slot corresponds to a unique update value. When the identifier associated with the UWB system is present in one of the plurality of slots, the priority value of the corresponding ranging session is updated by the corresponding unique update value.

In some embodiments, each slot of the plurality of slots corresponds to a unique frequency channel. During each ranging session, the processing circuit is further configured to transmit a ranging response message to the corresponding UWB anchor in the unique frequency channel of the slot in which the identifier associated with the UWB system is present. Based on the ranging response message received during each ranging session, the identifier associated with the UWB system is included in the RML of the ranging message of a subsequent ranging session.

In some embodiments, an access control device associated with the ranging session having a highest priority value, of the plurality of priority values, is dynamically prioritized to enable the operation between the UWB system and the corresponding access control device.

In some embodiments, the dynamic prioritization of one of the plurality of access control devices corresponds to scheduling of a corresponding ranging session a plurality of times in a sequential manner.

In some embodiments, during each ranging session, the processing circuit is further configured to transmit, in response to the ranging message, a ranging response message to the corresponding UWB anchor. Based on the ranging response message received during each ranging session, the identifier associated with the UWB system is included in the RML of the ranging message of a subsequent ranging session.

In some embodiments, the operation between the UWB system and an access control device that is dynamically prioritized corresponds to one of a group consisting of an access control operation and a transaction operation.

In some embodiments, when one of the plurality of access control devices is prioritized, the processing circuit schedules the corresponding ranging session a plurality of times in a sequential manner, with a distance between the UWB system and an access control device that is prioritized being determined for each ranging session by the corresponding access control device. When the UWB system is within an operational range of the access control device, the processing circuit is further configured to receive an authentication request generated by a control circuit of the access control device and transmit an authentication response based on the authentication request to the control circuit of the access control device. The operation between the UWB system and the corresponding access control device is enabled based on the authentication response.

In some embodiments, the plurality of ranging sessions comprises a first ranging session and a second ranging session associated with a first access control device and a second access control device of the plurality of access control devices, respectively. The first ranging session and the second ranging session have a first priority value and a second priority value, respectively, that are equal. The processing circuit schedules the first ranging session in a first time block, receives a first ranging message from a first UWB anchor of the first access control device, and increments, when the identifier associated with the UWB system is present in the RML of the first ranging message, the first priority value such that the first priority value is greater than the second priority value. As the first priority value is incremented, the processing circuit schedules the first ranging session in a second time block that is subsequent to the first time block, thereby dynamically prioritizing the first access control device.

In some embodiments, if the identifier associated with the UWB system is present in the RML of the first ranging message received during the second time block, the first priority value is one of a group consisting of further incremented and retained, and the processing circuit schedules the first ranging session in a third time block that is subsequent to the second time block.

In some embodiments, the processing circuit schedules the second ranging session on a lapse of a predefined time duration. The predefined time duration corresponds to a predefined number of time blocks for which the first ranging session is scheduled sequentially. When the second ranging session is scheduled, the processing circuit receives a second ranging message from a second UWB anchor of the second access control device, and decrements the second priority value when the identifier associated with the UWB system is absent in the RML of the second ranging message. The decrement of the second priority value further enables the dynamic prioritization of the first access control device.

In some embodiments, the processing circuit schedules the second ranging session in a fourth time block, receives a second ranging message from a second UWB anchor of the second access control device, and increments the second priority value when the identifier associated with the UWB system is present in the RML of the second ranging message. The RML of the first ranging message comprises a first plurality of slots and the RML of the second ranging message comprises a second plurality of slots. Each of the first plurality of slots and the second plurality of slots is indicative of nearness of the UWB system to a corresponding UWB anchor and has a unique update value associated therewith. If the identifier associated with the UWB system is present at a higher slot in the RML of the first ranging message as compared to the RML of the second ranging message, an increment of the first priority value is greater than that of the second priority value, thereby dynamically prioritizing the first access control device.

In some embodiments, the identifier associated with the UWB system corresponds to a media access control address associated with the UWB system.

In some embodiments, the UWB system further comprises a communication circuit that is coupled to the processing circuit. The communication circuit is configured to enable communication between the UWB system and the plurality of UWB anchors of the plurality of access control devices.

In another embodiment of the present disclosure, a UWB communication method is disclosed. The UWB communication method may include creating, by a processing circuit of a UWB system, a plurality of ranging sessions for a plurality of access control devices associated with the UWB system. A plurality of UWB anchors, of the plurality of access control devices, are asynchronous. A plurality of priority values of the plurality of ranging sessions are equal. The UWB communication method may further include scheduling, by the processing circuit, the plurality of ranging sessions based on the plurality of priority values. Further, the UWB communication method may include receiving, by the processing circuit, during each ranging session, a ranging message from a corresponding UWB anchor. The ranging message comprises a ranging management list (RML) that includes a plurality of identifiers associated with a plurality of UWB systems that are within an access control range of the corresponding UWB anchor. The UWB communication method may further include updating, by the processing circuit, a priority value of each ranging session based on one of a presence and an absence of an identifier associated with the UWB system in the RML of the ranging message received during the corresponding ranging session. The UWB communication method may further include scheduling, by the processing circuit, the plurality of ranging sessions based on the updated priority value to dynamically prioritize one of the plurality of access control devices. Based on the dynamic prioritization of one of the plurality of access control devices, an operation between the UWB system and the corresponding access control device is enabled.

We claim:

1. An ultra-wideband (UWB) system, comprising:
a processing circuit configured to:
create a plurality of ranging sessions for a plurality of access control devices associated with the UWB system, wherein a plurality of UWB anchors, of the plurality of access control devices, are asynchronous, and wherein a plurality of priority values of the plurality of ranging sessions are equal;
schedule the plurality of ranging sessions based on the plurality of priority values;
receive, during each ranging session, a ranging message associated with a corresponding UWB anchor, wherein the ranging message comprises a ranging management list (RML) that includes a plurality of identifiers associated with a plurality of UWB systems that are within an access control range of the corresponding UWB anchor;
update a priority value of each ranging session based on one of a presence and an absence of an identifier associated with the UWB system in the RML of the ranging message received during the corresponding ranging session; and
schedule the plurality of ranging sessions based on the updated priority value to dynamically prioritize one of the plurality of access control devices, wherein based on the dynamic prioritization of one of the plurality of access control devices, an operation between the UWB system and the corresponding access control device is enabled.

2. The UWB system of claim 1, wherein the processing circuit is further configured to receive, for each access control device of the plurality of access control devices, a wake-up message when the UWB system is within a coverage range of the corresponding access control device, and wherein each ranging session of the plurality of ranging sessions is created based on the receipt of the corresponding wake-up message.

3. The UWB system of claim 1, wherein the processing circuit is further configured to:
schedule the plurality of ranging sessions, based on the creation thereof, to receive a plurality of ranging initiation messages associated with the plurality of UWB anchors, wherein the plurality of ranging sessions are scheduled in a sequential manner, with each ranging session being scheduled until a corresponding ranging initiation message is received;
identify whether the plurality of ranging initiation messages are overlapping based on the receipt thereof;
determine that the plurality of access control devices are asynchronous based on the identification that the plurality of ranging initiation messages are overlapping; and
assign the plurality of priority values, that are equal, to the plurality of ranging sessions based on the determination that the plurality of access control devices are asynchronous.

4. The UWB system of claim 1, wherein the update of the priority value of each ranging session corresponds to an increment of the priority value when the identifier associated with the UWB system is present in the RML of the ranging message received during the corresponding ranging session.

5. The UWB system of claim 1, wherein the update of the priority value of each ranging session corresponds to a decrement of the priority value when the identifier associated with the UWB system is absent in the RML of the ranging message received during the corresponding ranging session.

6. The UWB system of claim 5, wherein the priority value of each ranging session is further decremented when the identifier associated with the UWB system is present in the RML of at least one ranging message received during at least one preceding ranging session associated with a different UWB anchor.

7. The UWB system of claim 1, wherein the RML, of the ranging message received during each ranging session, comprises a plurality of slots associated with the plurality of UWB systems such that the plurality of slots are indicative of nearness of the plurality of UWB systems to the corresponding UWB anchor, wherein each slot corresponds to a unique update value, and wherein when the identifier associated with the UWB system is present in one of the plurality of slots, the priority value of the corresponding ranging session is updated by the corresponding unique update value.

8. The UWB system of claim 7, wherein each slot of the plurality of slots corresponds to a unique frequency channel, wherein during each ranging session, the processing circuit is further configured to transmit a ranging response message to the corresponding UWB anchor in the unique frequency channel of a slot in which the identifier associated with the UWB system is present, and wherein based on the ranging response message received during each ranging session, the identifier associated with the UWB system is included in the RML of the ranging message of a subsequent ranging session.

9. The UWB system of claim 1, wherein an access control device associated with the ranging session having a highest priority value, of the plurality of priority values, is dynamically prioritized to enable the operation between the UWB system and the corresponding access control device.

10. The UWB system of claim 1, wherein the dynamic prioritization of one of the plurality of access control devices corresponds to scheduling of a corresponding ranging session a plurality of times in a sequential manner.

11. The UWB system of claim 1, wherein during each ranging session, the processing circuit is further configured to transmit, in response to the ranging message, a ranging response message to the corresponding UWB anchor, and wherein based on the ranging response message received during each ranging session, the identifier associated with the UWB system is included in the RML of the ranging message of a subsequent ranging session.

12. The UWB system of claim 1, wherein the operation between the UWB system and an access control device that is dynamically prioritized corresponds to one of a group consisting of an access control operation and a transaction operation.

13. The UWB system of claim 1,
wherein when one of the plurality of access control devices is prioritized, the processing circuit schedules the corresponding ranging session a plurality of times in a sequential manner, with a distance between the UWB system and an access control device that is prioritized being determined for each ranging session by the corresponding access control device,
wherein when the UWB system is within an operational range of the access control device, the processing circuit is further configured to (i) receive an authentication request generated by a control circuit of the access control device and (ii) transmit an authentication response based on the authentication request to the control circuit of the access control device, and
wherein the operation between the UWB system and the corresponding access control device is enabled based on the authentication response.

14. The UWB system of claim 1,
wherein the plurality of ranging sessions comprises a first ranging session and a second ranging session associated with a first access control device and a second access control device of the plurality of access control devices, respectively,
wherein the first ranging session and the second ranging session have a first priority value and a second priority value, respectively, that are equal,
wherein the processing circuit schedules the first ranging session in a first time block, receives a first ranging message from a first UWB anchor of the first access control device, and increments, when the identifier associated with the UWB system is present in the RML of the first ranging message, the first priority value such that the first priority value is greater than the second priority value, and
wherein as the first priority value is incremented, the processing circuit schedules the first ranging session in a second time block that is subsequent to the first time block, thereby dynamically prioritizing the first access control device.

15. The UWB system of claim 14, wherein if the identifier associated with the UWB system is present in the RML of the first ranging message received during the second time block, the first priority value is one of a group consisting of (i) further incremented and (ii) retained, and the processing circuit schedules the first ranging session in a third time block that is subsequent to the second time block.

16. The UWB system of claim 14, wherein the processing circuit schedules the second ranging session on a lapse of a predefined time duration, wherein the predefined time duration corresponds to a predefined number of time blocks for which the first ranging session is scheduled sequentially, wherein when the second ranging session is scheduled, the processing circuit receives a second ranging message from a second UWB anchor of the second access control device, and decrements the second priority value when the identifier associated with the UWB system is absent in the RML of the second ranging message, and wherein the decrement of the second priority value further enables the dynamic prioritization of the first access control device.

17. The UWB system of claim 14,
wherein the processing circuit schedules the second ranging session in a fourth time block, receives a second ranging message from a second UWB anchor of the second access control device, and increments the second priority value when the identifier associated with the UWB system is present in the RML of the second ranging message,
wherein the RML of the first ranging message comprises a first plurality of slots, and the RML of the second ranging message comprises a second plurality of slots,
wherein each of the first plurality of slots and the second plurality of slots is indicative of nearness of the UWB system to a corresponding UWB anchor and has a unique update value associated therewith, and
wherein if the identifier associated with the UWB system is present at a higher slot in the RML of the first ranging message as compared to the RML of the second ranging message, an increment of the first priority value is greater than that of the second priority value, thereby dynamically prioritizing the first access control device.

18. The UWB system of claim 1, wherein the identifier associated with the UWB system corresponds to a media access control address associated with the UWB system.

19. The UWB system of claim 1, further comprising a communication circuit that is coupled to the processing circuit, wherein the communication circuit is configured to enable communication between the UWB system and the plurality of UWB anchors of the plurality of access control devices.

20. An ultra-wideband (UWB) communication method, comprising:
creating, by a processing circuit of an ultra-wideband (UWB) system, a plurality of ranging sessions for a plurality of access control devices associated with the UWB system, wherein a plurality of UWB anchors, of the plurality of access control devices, are asynchronous, and wherein a plurality of priority values of the plurality of ranging sessions are equal;
scheduling, by the processing circuit, the plurality of ranging sessions based on the plurality of priority values;
receiving, by the processing circuit, during each ranging session, a ranging message from a corresponding UWB anchor, wherein the ranging message comprises a ranging management list (RML) that includes a plurality of identifiers associated with a plurality of UWB systems that are within an access control range of the corresponding UWB anchor;
updating, by the processing circuit, a priority value of each ranging session based on one of a presence and an absence of an identifier associated with the UWB system in the RML of the ranging message received during the corresponding ranging session; and
scheduling, by the processing circuit, the plurality of ranging sessions based on the updated priority value to dynamically prioritize one of the plurality of access control devices, wherein based on the dynamic prioritization of one of the plurality of access control devices, an operation between the UWB system and the corresponding access control device is enabled.

* * * * *